United States Patent [19]

Argabright et al.

[11] Patent Number: 4,778,607
[45] Date of Patent: Oct. 18, 1988

[54] METHOD OF DILUTING A CONCENTRATED POLYMER SOLUTION FOR USE IN A HYDROCARBON RECOVERY PROCESS

[75] Inventors: Perry A. Argabright, Larkspur; Wayne E. Luetzelschwab, Littleton, both of Colo.

[73] Assignee: Marathon Oil Company, Findlay, Ohio

[21] Appl. No.: 26,595

[22] Filed: Mar. 17, 1987

Related U.S. Application Data

[63] Continuation-in-part of Ser. No. 605,444, Apr. 30, 1984, abandoned.

[51] Int. Cl.$^4$ .................. C09K 3/00; B66D 1/20; E21B 43/16
[52] U.S. Cl. ................... 252/8.551; 166/268; 252/312
[58] Field of Search ......... 252/8.55, 8.5, 312; 422/256, 901, 257, 255; 366/366; 166/268, 269; 604/892; 222/95, 386.5; 210/696, 791; 524/424, 425, 2; 526/63; 528/484

[56] References Cited

U.S. PATENT DOCUMENTS

| | | | |
|---|---|---|---|
| 3,865,108 | 2/1975 | Hartop | 222/95 |
| 3,909,423 | 9/1975 | Hessert et al. | 252/8.55 D |
| 3,995,632 | 12/1976 | Nakano et al. | 222/95 |
| 4,203,439 | 5/1980 | Theeuves | 222/386.5 |
| 4,350,271 | 9/1982 | Eckenhoff | 222/386.5 |
| 4,402,916 | 9/1983 | Luetzelschwab | 422/901 |

OTHER PUBLICATIONS

"Gels", *Scientific America*, v 224, No. 1, pp 124–138, Tanaka, Jan. 1981.
"Mechanism of Polyacrylamide Gel Syneresis . . . ", *SPE*, DiGiacomo et al., SPE 11787, 1983.

Primary Examiner—Barry S. Richman
Assistant Examiner—T. J. Wallen
Attorney, Agent, or Firm—Jack L. Hummel; Rodney F. Brown

[57] ABSTRACT

A water-soluble inorganic non-crosslinking salt is incorporated in an aqueous gel-like solution of a water-soluble uncrosslinked polymer at an initial higher polymer concentration. The salt accelerates the dilution of the polymer solution with an aqueous diluent to an aqueous polymer solution at a predetermined lower polymer concentration. The gel-like polymer solution is diluted without substantially degrading the polymer so that it retains desirable properties for use in a hydrocarbon recovery process.

25 Claims, 2 Drawing Sheets

METHOD OF DILUTING A CONCENTRATED POLYMER SOLUTION FOR USE IN A HYDROCARBON RECOVERY PROCESS

CROSS-REFERENCE TO RELATED APPLICATION

This is a continuation-in-part of application Ser. No. 605,444 filed on Apr. 30, 1984.

BACKGROUND OF THE INVENTION

1. Technical Field

The present invention relates to a method of diluting a polymer solution and more particularly to a method of diluting a concentrated polymer solution for use in a hydrocarbon recovery process.

2. Description of Related Art

Dilute aqueous polymer solutions are commonly used in secondary and tertiary hydrocarbon recovery processes. For example, the dilute polymer solutions are employed as displacement fluids in immiscible floods and mobility buffers in miscible floods of subterranean hydrocarbon-bearing formations.

The water-soluble polymers used in these processes are usually manufactured in solution at locations remote from the oil field injection site. Therefore, it is necessary to transfer the polymer from the point of manufacture to the point of use. The polymer is transported in one of two forms, either the solution form as manufactured or a dried solid form.

The polymer is preferably maintained in the solution form because the drying process can detrimentally degrade the polymer. However, it is generally necessary to dilute the polymer solution before injection into a formation because most polymer solutions are too concentrated as manufactured for subterranean applications. Dilution is preferably performed at the injection site because transportation of a bulk dilute polymer solution from a remote dilution site to an injection site is relatively expensive.

Concentrated polymer solutions are difficult to dilute because the concentrated solution can have a gel-like character, even if the polymer is uncrosslinked. That is to say, a concentrated uncrosslinked polymer solution can exhibit an extreme resistance to flow similar to a cross-linked polymer gel which prevents the solution from rapidly and spontaneously dispersing in a dilution water, although the polymer may be characterized as water-soluble.

Known means of diluting a concentrated uncrosslinked polymer solution with an aqueous diluent include agitation of the solution in the presence of the diluent using stirrers, blenders or the like to physically break up the gel-like solution and disperse it in the diluent. Agitation methods are usually rapid, but they can degrade the polymer to such a degree that the resulting dilute polymer solution is unacceptable for many hydrocarbon recovery applications.

Other means of dilution rely on passive diffusion of the diluent into the polymer solution. Tanaka describes principles of polymer gel dilution by diffusion, i.e., swelling, in "Gels", *Scientific American*, v. 244, No. 1, pp. 124–138 (January 1981). Diffusion methods are comparatively slow for oil field use, especially when the aqueous diluent has a high salt concentration, such as a formation brine. Despite their slowness, diffusion-type dilution processes are preferred because degradation of the polymer is minimized.

U.S. Pat. No. 4,402,916 to Luetzelschwab describes an apparatus utilizing a diffusion method to dilute a concentrated uncrosslinked polymer solution with an aqueous diluent. The apparatus promotes rapid diffusion of the diluent into the gel-like polymer solution by sequentially increasing the surface area of the solution. The apparatus is relatively effective for rapid dilution of the polymer solution with a fresh water diluent, but is less effective for rapid dilution when the diluent is a brine.

A method is needed to accelerate the dilution of a gel-like concentrated water-soluble polymer solution with an aqueous diluent and particularly with a brine diluent. A method is needed which accelerates the dilution rate of the polymer solution without substantially degrading the polymer so that the polymer retains favorable properties for hydrocarbon recovery applications.

SUMMARY OF THE INVENTION

The present invention is a method of diluting a gel-like aqueous solution of a substantially uncrosslinked water-soluble polymer at an initial higher polymer concentration to a predetermined lower polymer concentration with an aqueous diluent. The method accelerates the dilution rate thereby reducing the dilution time without substantially degrading the water-soluble polymer.

The method comprises adjusting the salt concentration of the polymer solution prior to dilution. An inorganic water-soluble non-crosslinking salt, which is substantially incapable of crosslinking the polymer, is incorporated in the polymer solution prior to dilution of the polymer. The amount of non-crosslinking salt incorporated in the polymer solution is sufficient to raise the non-crosslinking salt concentration of the solution greater than or equal to the non-crosslinking salt concentration of the aqueous diluent used to dilute the polymer solution.

The salt-containing higher concentration polymer solution is contacted with the aqueous diluent in a manner which effects dilution without substantially crosslinking or degrading the polymer in solution. The diluent and polymer solution are contacted until a uniform dilute polymer solution is produced having a predetermined polymer concentration lower than the polymer concentration of the initial polymer solution.

The method of the present invention is particularly useful for oil field applications. It enables the practitioner to dilute a high concentration polymer solution with a brine diluent on-site at a relatively rapid rate, approaching the same rapid rate as dilution with fresh water, to produce a dilute polymer solution at the wellhead for injection into a formation.

The rapid dilution rate effects cost savings because brines are generally more cheaply available than fresh water in oil fields and because the sizing of the dilution equipment and vessels is minimized. On-site dilution of the aqueous polymer solution considerably reduces the required handling and transportation of the solution and renders the dilute solution immediately available for secondary and tertiary hydrocarbon recovery applications.

DESCRIPTION OF PREFERRED EMBODIMENTS

Figure 1:
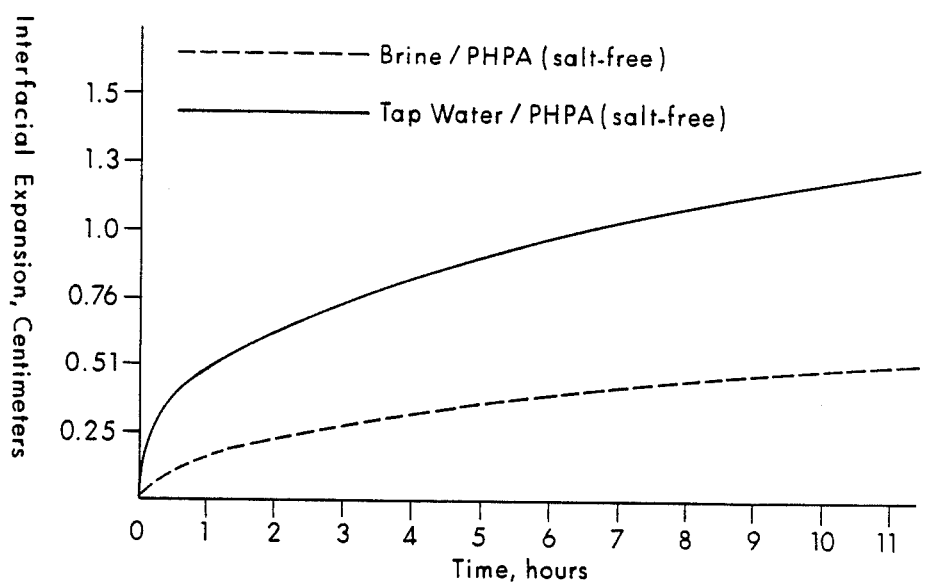
FIG. 1 is a graph which compares the dilution rates of an aqueous salt-free high concentration uncrosslinked polymer solution by two different diluents, fresh water and brine.

In accordance with the present invention, a water-soluble inorganic non-crosslinking salt is incorporated in a gel-like solution of an uncrosslinked polymer to accelerate dilution of the solution by an aqueous diluent. A non-crosslinking salt is defined herein as a water-soluble inorganic salt which is substantially incapable of crosslinking the uncrosslinked polymer in solution, even at relatively high salt concentrations, and which does not in fact substantially crosslink the polymer on contact. Substantial polymer crosslinking is indicated by a significant detectable increase in the viscosity of the polymer solution when contacted by the salt.

The gel-like solution of the present method comprises a substantially uncrosslinked water-soluble polymer in an aqueous solvent. The aqueous solvent is commonly an aqueous polymerization medium if the gel-like solution is the product of a solution polymerization process, which is often the case as discussed below. A gel-like solution is defined herein as a solution which has the physical properties and appearance of a gel, yet does not have the chemically crosslinked network structure of a gel.

The gel-like solution of the present process is extremely resistant to flow. The resistance of the gel-like solution to flow is attributable solely to the high concentration of uncrosslinked polymer molecules in the solution rather than any chemical crosslinking between the polymer molecules as in a conventional crosslinked gel. The uncrosslinked polymer molecules in a concentrated solution are in close physical proximity to one another which causes them to physically bunch and entangle, even without chemical bonding. This bunching tends to increase the viscosity of the solution.

This qualitative definition of a gel-like solution generally correlates quantitatively to the viscosity of the solution. A gel-like solution of the present invention generally has a T-bar viscosity as measured by a Brookfield viscometer greater than about 100,000 cp, preferably greater than about 500,000 cp, and most preferably greater than about 1,000,000 cp. The T-bar viscosity of a solution is a function of the polymer species, the polymer concentration in the solution and the molecular weight of the polymer.

A number of polymer species are useful in the present invention. They are typically manufactured by solution polymerization processes which avoid substantial crosslinking of the polymer. A polymerization process representative of those which produce gel-like uncrosslinked polymer solutions is disclosed in U.S. Pat. No. Re. 32,114 and is incorporated herein by reference.

The polymer may be substantially any polymer or copolymer obtained from monomers containing at least one vinyl group, including ethylenically unsaturated monomers, such as acrylamide, acrylic acid, acrylonitrile, methacrylic acid, methacrylamide, methacrylonitrile, methylmethacrylate, ethylmethacrylate, etc.; water-soluble salts such as sodium acrylate, sodium methacrylate, sodium styrene sulfonate, etc.; and mixtures thereof. The resulting polymer is not contacted with a crosslinking agent. Thus, it remains substantially uncrosslinked.

Gel-like solutions of uncrosslinked polymers are typically characterized as having relatively high polymer concentrations, i.e., above about 2% by weight and preferably above about 3% by weight. Within this concentration range, many polymer solutions appear and behave like a crosslinked gel although no substantial crosslinking is present. A gel-like high concentration uncrosslinked polymer solution useful in the present invention has a polymer concentration range of about 2% to about 20% by weight, preferably about 5% to about 15% by weight, and most preferably about 6% to about 10% by weight.

Above a polymer concentration of about 20% by weight, an uncrosslinked polymer solution may in some instances exhibit autocrosslinking, even in the absence of a crosslinking agent, due simply to the close proximity of the polymer molecules to one another. Solutions exhibiting substantial autocrosslinking are not applicable to the present invention.

The average molecular weight of polymers useful in the present invention can fall within a very broad range, i.e., from about 10,000 to about 50 million. However, the average molecular weight of polymers typically used in the present invention is about 1 million to about 20 million and preferably about 4 million to about 15 million.

Of the polymer solutions meeting these criteria, partially hydrolyzed polyacrylamide (PHPA) is preferred. PHPA is prepared in solution by polymerizing the acrylamide monomer and thereafter hydrolyzing a portion of the amide groups comprising the polyacrylamide. Alternatively, PHPA is prepared by copolymerizing acrylamide with sodium acrylate in the appropriate proportions. In either case, the resulting PHPA is at least about 20% hydrolyzed and preferably about 20 to 40% hydrolyzed.

The non-crosslinking water-soluble inorganic salt in the form of a solid or a solution is incorporated in the gel-like polymer solution prior to dilution. According to one embodiment, the non-crosslinking salt is added to the monomer during the polymerization reaction so that the salt is incorporated in the resulting polymer solution. For example, a brine can be employed as the polymerization medium of a solution polymerization process. The brine becomes the solvent of the resulting gel-like polymer solution and the salt in the brine is incorporated in the gel-like solution according to the present invention. Alternatively, the non-crosslinking salt can be incorporated in the polymer solution by adding it to the polymer solution any time after polymerization, but before dilution.

A number of inorganic water-soluble salts, which do not substantially crosslink the polymer, can be employed in the present process. However, salts which substantially crosslink the polymer are specifically excluded from the present invention. Salts excluded from the present invention include salts of transition metals and other polyvalent metals, such as salts of chromium and manganese. These salts are commonly known as crosslinking agents or crosslinking salts and do not fit the above-stated definition of non-crosslinking salts. Salts of divalent cations, such as magnesium, calcium, strontium, and barium, are also sometimes known as crosslinking agents. They are relatively weak crosslinking agents, but, nevertheless, they are not particularly desirable in the present invention because they can form precipitates in basic environments.

Preferred non-crosslinking salts for use in the present invention are halogen salts of monovalent cations, including salts such as sodium chloride, potassium chloride, lithium chloride, ammonium chloride, and like iodide and bromide salts, etc. Of these salts, sodium chloride is the most preferred salt, not only because it effectively accelerates dilution of the polymer solution, but also because it is compatible with formation brines, inert in the water-soluble polymers and monomers of the present invention, and low in cost. Other non-crosslinking salts which may be employed in the present invention include sulfate salts of monovalent cations.

The amount of non-crosslinking salt incorporated in the aqueous polymer solution is a function of the ionic character of the polymer solution and aqueous diluent. Thus, if the diluent is a brine, it will be necessary to incorporate more salt in the polymer solution than if the diluent is fresh water. Conversely, if the polymer solution already contains some non-crosslinking salt before the present process is employed, less salt need be incorporated into the solution.

In all cases, however, the non-crosslinking salt concentration of the polymer solution is advantageously less than that of the diluent before the non-crosslinking salt concentration of the solution is adjusted. Thereafter, the non-crosslinking salt concentration of the solution is adjusted such that it is greater than or equal to that of the diluent. Generally the non-crosslinking salt is added to the polymer solution in an amount such that the total non-crosslinking salt concentration of the solution is within a range of about 5000 to about 500,000 ppm and preferably about 20,000 to about 250,000 ppm of the total weight of the polymer solution.

After adjusting the non-crosslinking salt concentration of the polymer solution, it is contacted with the aqueous diluent. The aqueous diluent is preferably substantially free of polymer before it contacts the polymer solution. However, in the case where the diluent is a produced water from a formation which has been or is being polymer flooded, the diluent may contain residual polymer. Nevertheless, the aqueous diluent is in most cases substantially less viscous than the gel-like polymer solution.

The aqueous diluent can be inter alia distilled water, fresh water or a brine, such as seawater or produced water. The diluent can be identical to the solvent of the gel-like solution. The present method is most effective for accelerating the dilution rate of a brine diluent. Thus, a brine diluent is preferred in the practice of the present invention.

The aqueous diluent is substantially free of crosslinking salts. By "substantially free of crosslinking salts", it is meant that the diluent does not contain crosslinking salts in a concentration sufficient to substantially crosslink the polymer. Thus, the diluent may by defintion be substantially free of crosslinking salts, yet inherently contain small naturally-occurring concentrations of crosslinking salts subject to the limitation that the salts do not substantially crosslink the polymer. However, it is preferred that the diluent contain crosslinking salts in concentrations no higher than trace levels.

Generally, fresh water is substantially free of crosslinking salts; some brines are substantially free of crosslinking salts while others are not. Brines which are not substantially free of crosslinking salts are excluded from the practice of the present invention. The maximum crosslinking salt concentration in a brine, which the present invention can tolerate, is a function of the specific crosslinking salt. Salts of divalent cations such as $Mg^{++}$ and $Ca^{++}$, which are relatively weak crosslinking agents, can generally be tolerated in a brine at cation concentrations up to about 5000 ppm, preferably up to about 1000 ppm, and most preferably up to about 100 ppm. Stronger crosslinking agents, such as salts of polyvalent transition metals, are tolerated in a brine only at much lower concentrations. The transition metal cation concentration in the brine should not exceed trace levels of about 25 ppm and preferably about 1 ppm.

A brine is defined herein as a non-potable water which generally has a total dissolved solids concentration above about 1000 ppm while a fresh water is a potable water having a total dissolved solids concentration below about 1000 ppm. Brines useful as diluents in the present invention have a total dissolved solids concentration above about 1000 ppm, more preferably above about 5000 ppm and most preferably above about 30,000 ppm.

The upper limit on the total dissolved solids concentration of brines useful as diluents in the present invention is simply the saturation point of the solids, which depends on the specific solid, but can be as high as 200,000 ppm or more for many dissolved solids. The total dissolved solids concentration ranges of the brines listed above are in many cases also a close approximation of the non-crosslinking salt concentration ranges of the brines because the bulk of the solids in the brine is usually non-crosslinking salts.

The gel-like polymer solution contacts the aqueous diluent in any means which enables diffusion between the polymer solution and the diluent, but does not substantially degrade the polymer. The contacting means can be as simple as a vessel such as a tank. A more sophisticated contacting means is the sequential screen diluter apparatus described in U.S. Pat. No. 4,402,916 and incorporated herein by reference. The sequential screen diluter is the preferred contacting means, being rapid and non-destructive of the polymer.

The primary mechanism for accelerated dilution of the polymer is believed to be a diffusion driving force, which causes water to flow from the aqueous diluent into the gel-like polymer solution thereby swelling the gel-like solution. Diffusion drives the water across the interface between the diluent phase and the gel-like polymer phase with the interface acting as a semipermeable membrane.

The diffusion rate is a function of the salt concentration gradient. Diffusion of water between two aqueous phases preferentially goes in the direction of the phase having the highest salt concentration. The diffusion rate decreases as the salt concentration gradient decreases toward equilibrium.

Solution polymerization, which is used to produce polymers applicable to the present invention, is usually conducted by polymerizing a monomer in an aqueous polymerization medium. The medium is often fresh water, but can also be a brine or deionized water. The resulting polymer solution has a relatively low salt concentration, although some ionic character is imparted to the product by hydrolysis. When the polymer solution having a low salt concentration is contacted with a fresh water diluent also having a low salt concentration, the diffusion of water into the polymer solution is slow because the salt concentration gradient at the interface is unfavorably small. If the diluent is a brine, having a relatively high salt concentration, the salt concentration gradient at the interface is even less favorable because the gradient is in the wrong direction.

Incorporation of a non-crosslinking salt in the aqueous gel-like polymer solution prior to dilution, even in very small amounts, produces a more favorable salt concentration gradient between the diluent and polymer phases during dilution than if no salt is incorporated in the polymer solution. The increased salt concentration of the polymer solution accelerates the diffusion rate of water from the diluent into the polymer solution.

The most favorable salt concentration gradients occur when the non-crosslinking salt is incorporated in the gel-like solution in an amount sufficient to create a concentration in the solution greater than or equal to the non-crosslinking salt concentration of the diluent as in the manner of the present invention. Thereafter, contact between the polymer phase and the diluent phase is maintained until diffusion is complete and the interface between the two phases disappears and they merge into a single homogeneous aqueous dilute polymer solution which does not exhibit syneresis. The resulting dilute polymer solution has a predetermined polymer concentration lower than the polymer concentration of the initial gel-like polymer solution.

Generally it is desirable to dilute the higher concentration gel-like polymer solution to a dilute solution having a lower polymer concentration below about 3% by weight and preferably below about 2% by weight. The lower concentration dilute polymer solution is also substantially less viscous than the higher concentration gel-like solution. The dilute polymer solution has a viscosity below about 200,000 cp and preferably below about 100,000 cp. Below the above-stated concentration and viscosity limits, the polymer solution is no longer gel-like, i.e., it no longer has the physical characteristics of a crosslinked gel. Thus, the dilute polymer solution can be readily diluted further with little shear to still lower concentrations by repeating the instant method or employing rapid dilution methods known in the art.

The end use of the polymer determines the concentration to which the polymer solution is finally diluted. For example, a partially hydrolyzed polyacrylamide solution injected into a hydrocarbon-bearing reservoir as a displacement fluid for enhanced oil recovery typically has a polymer concentration of about 50 ppm to about 20,000 ppm, preferably about 100 ppm to 5,000 ppm, and most preferably about 250 ppm to about 2,000 ppm.

The following examples illustrate applications of the method of the present invention and are not to be construed as limiting the scope thereof.

EXAMPLE 1

The diffusion rate of water from an aqueous diluent into a gel-like PHPA solution is measured by placing a volume of the gel-like PHPA solution in a graduated cylinder. A volume of aqueous diluent is then added to the graduated cylinder. The diluent remains on top of the gel-like PHPA solution in the cylinder and an interface forms at their plane of intersection. The position of the interface is observed as a function of time. Upward movement of the interface indicates expansion or swelling of the gel-like solution caused by diffusion of water into the polymer solution from the aqueous diluent. The rate at which the interface rises represents the diffusion rate of water into the polymer solution. Conversely, no substantial amount of polymer is observed to diffuse from the polymer solution into the aqueous diluent.

FIG. 1 shows the diffusion rates of water from two different diluents into two samples of a 6.5% by weight solution of 30% hydrolyzed polyacrylamide (PHPA) having an average molecular weight of 5,000,000, which is substantially salt-free. The 6.5% PHPA solution is gel-like and difficult to dissolve in water. The bottom curve shows the diffusion rate of water from a brine containing 20,000 ppm NaCl into the salt-free PHPA solution. The top curve shows the diffusion rate of a fresh tap water from Littleton, Colo., U.S.A., having a total dissolved solids concentration of about 150 ppm, into the salt-free PHPA solution.

Movement of the interface is recorded over a time period of 11 hours from the initial contacting of the polymer solution with the aqueous diluent. The results indicate that the diffusion rate of water from the brine, having a high salt concentration, into the salt-free PHPA solution is significantly less than from the tap water, having a substantially lower salt concentration, into the salt-free PHPA solution.

EXAMPLE 2

NaCl is added to the salt-free PHPA solution of Example 1 in an amount which raises the NaCl concentration in the PHPA solution to 100,000 ppm. The resulting PHPA solution is diluted with the brine of Example 1, having an NaCl concentration of 20,000 ppm and the diffusion rate of the brine diluent into the PHPA solution is determined.

Figure 2:
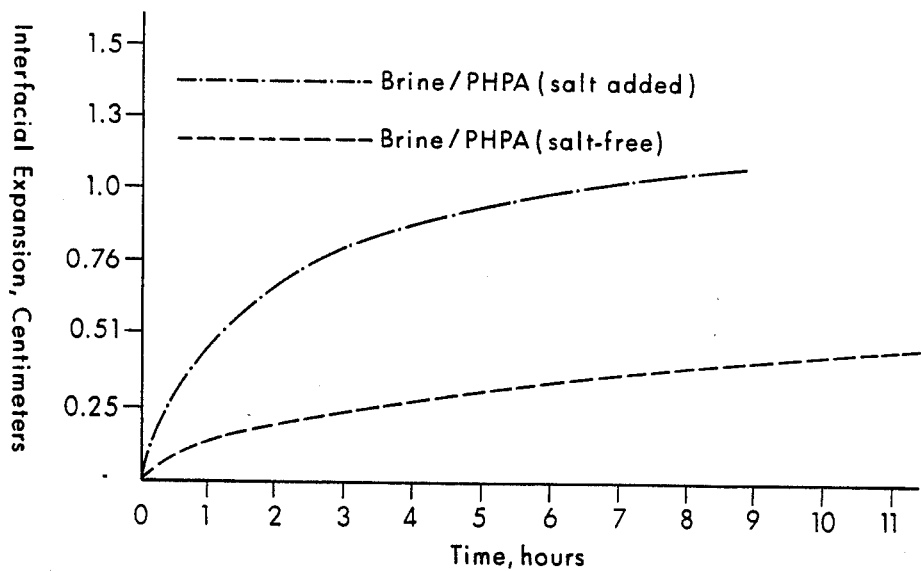
FIG. 2 is a graph which shows the dilution rate by a brine diluent of an aqueous high concentration uncrosslinked polymer solution, having an inorganic water-soluble non-crosslinking salt of the present invention added thereto. The curve of FIG. 1, showing the dilution rate of the salt-free polymer solution by a brine, is superimposed onto FIG. 2 for comparison.

The results, as shown in FIG. 2, reflect the improved dilution rate effected by the method of the present invention. The addition of salt to the PHPA solution substantially accelerates the diffusion rate of water from brine into the PHPA solution. The diffusion rate of water from brine into the salt-containing PHPA solution is substantially the same as the diffusion rate of water from tap water into the salt-free PHPA solution.

EXAMPLE 3

A series of aqueous PHPA solutions are prepared at different polymer concentrations. The PHPA is 30% hydrolyzed and has an average molecular weight of 11,000,000. The aqueous solvent is the fresh tap water of Example 1. The viscosity of each solution is determined at 22.2° C. and corrected to 37.8° C. using a Brookfield HB viscometer with a Brookfield T-A spindle at 0.5 rpm. The T-A spindle reading is converted to units of centipoise by multiplying the reading by 32,000. The results are shown in the table below and plotted in FIG. 3.

| PHPA Concentration (wt %) | Viscosity (cp) |
| --- | --- |
| 8.0 | 1,696,000 |
| 6.5 | 1,120,000 |
| 4.8 | 608,000 |
| 3.2 | 300,800 |

| PHPA Concentration (wt %) | Viscosity (cp) |
| --- | --- |
| 2.2 | 144,000 |
| 1.1 | 89,600 |

Figure 3:
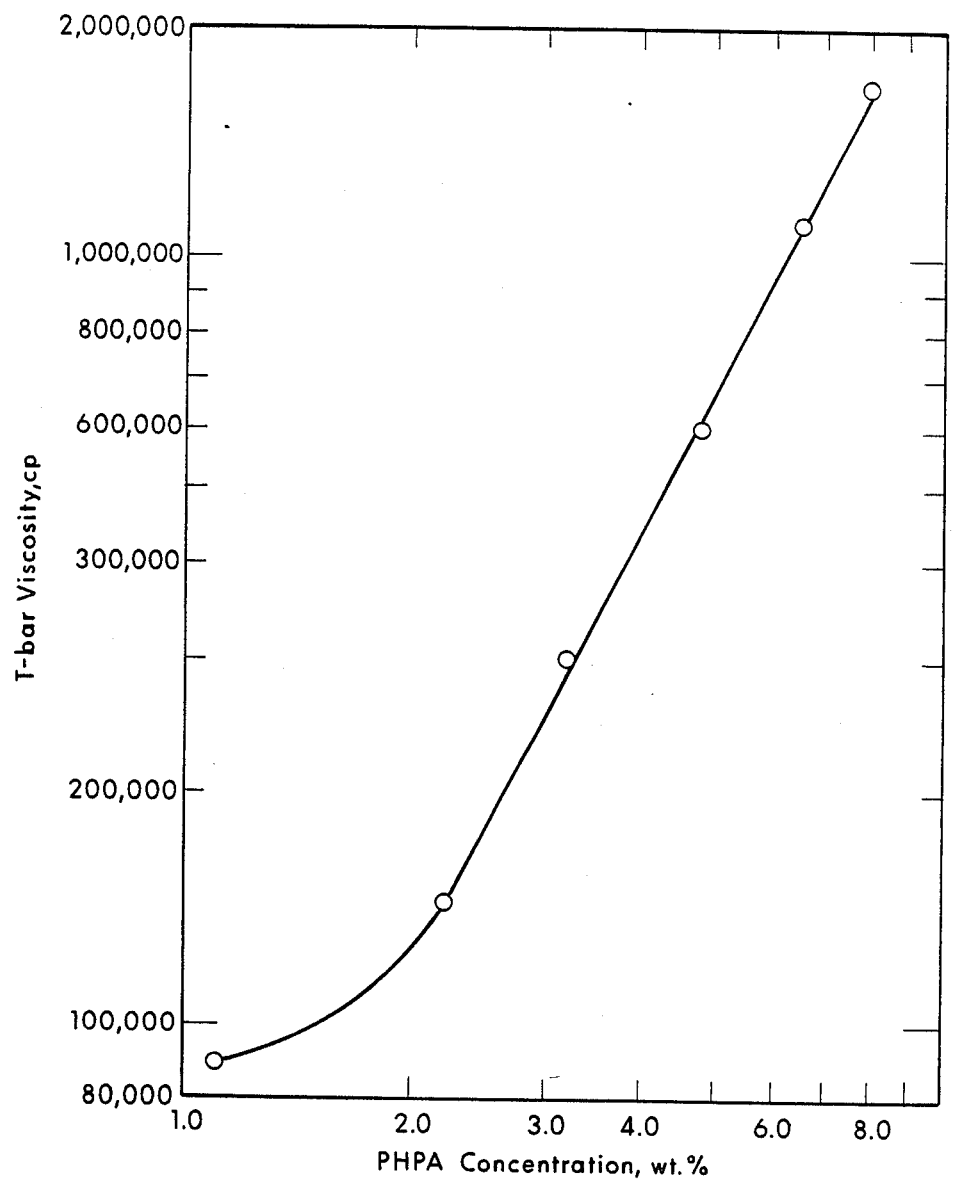
FIG. 3 is a graph which shows the viscous character of polymer solutions as a function of polymer concentration.

An inflection point occurs on the curve of FIG. 3 at a PHPA concentration of about 2.2% by weight and a T-bar viscosity of about 140,000 cp. This shows that solutions above this point on the curve are gel-like while those below are not.

While the foregoing preferred embodiment of the invention has been described and shown, it is understood that all alternatives and modifications, such as those suggested and others, may be made thereto and fall within the scope of the invention.

We claim:

1. A method of diluting an aqueous solution of a substantially uncrosslinked water-soluble polymer from a gel-like solution at an initial higher polymer concentration to a less viscous solution at a predetermined lower polymer concentration comprising the steps of:
   (a) adding a water-soluble inorganic non-crosslinking salt to a monomer solution in an amount sufficient to obtain a non-crosslinking salt concentration of about 5000 ppm to about 500,000 ppm in said gel-like solution;
   (b) polymerizing said monomer solution to produce said gel-like solution of said uncrosslinked water-soluble polymer containing said non-crosslinking salt; and
   (c) contacting said salt-containing gel-like solution of said uncrosslinked polymer with an aqueous diluent substantially free of crosslinking salts and having a non-crosslinking salt concentration less than or equal to said non-crosslinking salt concentration of said salt-containing gel-like solution without substantially degrading the polymer for a time sufficient to dilute said gel-like solution to said less viscous solution having said predetermined lower concentration of said substantially uncrosslinked polymer.

2. The method of claim 1 wherein said monomer solution is comprised of one or more types of monomers containing at least one vinyl group.

3. The method of claim 2 wherein said uncrosslinked polymer is partially hydrolyzed polyacrylamide which is greater than about 20% hydrolyzed.

4. The method of claim 3 wherein said initial higher polymer concentration of said gel-like solution is from about 5% to about 15% by weight.

5. The method of claim 4 wherein said predetermined lower polymer concentration of said less viscous solution is less than about 2% by weight.

6. The method of claim 3 wherein the viscosity of said gel-like solution is greater than about 500,000 cp.

7. The method of claim 6 wherein the viscosity of said less viscous solution is less than about 100,000 cp.

8. The method of claim 1 wherein said water-soluble inorganic non-crosslinking salt is a halogen salt of a monovalent cation.

9. The method of claim 8 wherein said salt is sodium chloride.

10. The method of claim 1 wherein said aqueous diluent is a brine having a total dissolved solids concentration greater than about 30,000 ppm.

11. The method of claim 1 wherein said salt-containing gel-like solution is contacted with said aqueous diluent in a sequential screen diluter apparatus.

12. The method of claim 1 wherein said non-crosslinking salt concentration of said salt-containing gel-like solution is about 20,000 ppm to about 250,000 ppm.

13. A method of diluting an aqueous solution of a substantially uncrosslinked water-soluble polymer from a gel-like solution at an initial higher polymer concentration to a less viscous solution at a predetermined lower polymer concentration comprising the steps of:
   (a) adding a water-soluble inorganic non-crosslinking salt to said gel-like solution in an amount sufficient to obtain a non-crosslinking salt concentration of about 5000 ppm to about 500,000 ppm in said gel-like solution; and
   (b) contacting said salt-containing gel-like solution of said uncrosslinked polymer with an aqueous diluent substantially free of crosslinking salts and having a non-crosslinking salt concentration less than or equal to said non-crosslinking salt concentration of said salt-containing gel-like solution without substantially degrading the polymer for a time sufficient to dilute said gel-like solution to said less viscous solution having said predetermined lower concentration of said substantially uncrosslinked polymer.

14. The method of claim 13 wherein said uncrosslinked polymer is partially hydrolyzed polyacrylamide which is greater than about 20% hydrolyzed.

15. The method of claim 14 wherein said initial higher polymer concentration of said gel-like solution is about 5% to about 15% by weight.

16. The method of claim 15 wherein said predetermined lower polymer concentration of said less viscous solution is less than about 2% by weight.

17. The method of claim 14 wherein the viscosity of said gel-like solution is greater than about 500,000 cp.

18. The method of claim 15 wherein the viscosity of said less viscous solution is less than about 100,000 cp.

19. The method of claim 13 wherein said water-soluble inorganic non-crosslinking salt is a halogen salt of a monovalent cation.

20. The method of claim 19 wherein said salt is sodium chloride.

21. The method of claim 13 wherein said aqueous diluent is a brine having a total dissolved solids concentration greater than about 30,000 ppm.

22. The method of claim 13 wherein said salt-containing gel-like solution is contacted with said aqueous diluent in a sequential screen diluter apparatus.

23. The method of claim 13 wherein said non-crosslinking salt concentration of said salt-containing gel-like solution is about 20,000 ppm to about 250,000 ppm.

24. A method of diluting an aqueous solution of a substantially uncrosslinked partially hydrolyzed polyacrylamide from a gel-like solution at an initial higher polymer concentration to a less viscous solution at a predetermined lower polymer concentration comprising the steps of:
   (a) incorporating a water-soluble halogen salt of an inorganic monovalent cation in said gel-like solution in an amount sufficient to obtain a halogen salt concentration of about 5000 ppm to about 500,000 ppm in said gel-like solution; and
   (b) contacting said salt-containing gel-like solution with an aqueous diluent having a halogen salt concentration less than the halogen salt concentration of said gel-like solution without substantially degrading the partially hydrolyzed polyacrylamide for a time sufficient to dilute said gel-like solution to said less viscous solution of said substantially uncrosslinked partially hydrolyzed polyacrylamide.

25. A method of recovering a hydrocarbon from a subterranean hydrocarbon-bearing formation employing a dilute aqueous solution of a substantially uncrosslinked water-soluble polymer comprising the steps of:

(a) providing a gel-like solution of said polymer at an initial higher concentration, said solution having a water-soluble inorganic non-crosslinking salt incorporated therein at a concentration of about 5000 ppm to about 500,000 ppm;

(b) contacting said salt-containing gel-like solution with an aqueous diluent substantially free of crosslinking salts and having a non-crosslinking salt concentration less than or equal to said non-crosslinking salt concentration of said salt-containing gel-like solution without substantially degrading said polymer for a time sufficient to dilute said gel-like solution from said initial higher polymer concentration to a predetermined lower concentration of said substantially uncrosslinked polymer to obtain said dilute polymer solution; and (c) injecting said dilute polymer solution into said subterranean hydrocarbon-bearing formation as a displacement fluid to recover hydrocarbons therefrom.

* * * * *